US008620025B2

(12) United States Patent
Higuchi et al.

(10) Patent No.: US 8,620,025 B2
(45) Date of Patent: Dec. 31, 2013

(54) TRAVELING ENVIRONMENT RECOGNITION DEVICE

(75) Inventors: Mirai Higuchi, Mito (JP); Ryo Ota, Tokyo (JP); Takuya Naka, Hitachinaka (JP); Morihiko Sakano, Hitachi (JP); Shoji Muramatsu, Hitachinaka (JP); Tatsuhiko Monji, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 412 days.

(21) Appl. No.: 13/059,741

(22) PCT Filed: Jun. 24, 2009

(86) PCT No.: PCT/JP2009/062020
§ 371 (c)(1),
(2), (4) Date: May 19, 2011

(87) PCT Pub. No.: WO2010/032532
PCT Pub. Date: Mar. 25, 2010

(65) Prior Publication Data
US 2011/0222732 A1    Sep. 15, 2011

(30) Foreign Application Priority Data
Sep. 19, 2008    (JP) ................................. 2008-240166

(51) Int. Cl.
*G06K 9/00* (2006.01)
*G06K 9/36* (2006.01)
*G06K 9/32* (2006.01)

(52) U.S. Cl.
USPC ........... 382/103; 382/104; 382/291; 382/294; 382/299

(58) Field of Classification Search
None
See application file for complete search history.

(56) References Cited

U.S. PATENT DOCUMENTS 5,864,771 A * 1/1999 Yokoyama et al. ............. 701/51
7,031,496 B2 * 4/2006 Shimano et al. ............. 382/104

FOREIGN PATENT DOCUMENTS

JP    2007-066047    3/2007
JP    2008-114777    5/2008

OTHER PUBLICATIONS

English Language Translation of Japanese Office Action dated Jan. 24, 2012, Application No. 2008-240166.

* cited by examiner

*Primary Examiner* — Chan S Park
*Assistant Examiner* — Ha Le
(74) *Attorney, Agent, or Firm* — Antonelli, Terry, Stout & Kraus, LLP.

(57) ABSTRACT

In order to perform vehicle control, a warning process, and the like which do not give a driver an uncomfortable feeling in speed adjustment, a warning process, and the like corresponding to a road shape such as a curve, it is necessary to recognize not only a near road shape but also a far road shape with high accuracy. A traveling environment recognition device includes: a measurement unit which measures a target object; a three-dimensional object detection unit which detects a three-dimensional object on the basis of a signal acquired by the measurement unit; a road shape prediction unit which predicts a road shape on which a target vehicle is traveling; a three-dimensional object selection unit which selects, from among the three-dimensional objects detected by the three-dimensional object detection unit, only a three-dimensional object within a predetermined range from a point of the road predicted by the road shape prediction unit; and a road shape estimation unit which estimates the road shape on the basis of position information of the three-dimensional object selected by the three-dimensional object selection unit.

13 Claims, 14 Drawing Sheets

TRAVELING ENVIRONMENT RECOGNITION DEVICE

TECHNICAL FIELD

The present invention relates to a traveling environment recognition device which recognizes a road shape.

BACKGROUND ART

Adaptive cruise control (ACC) in which the speed of a target vehicle is controlled in accordance with the speed of a vehicle ahead by using a radar or the like has been adopted in commercialized products. Further, in recent years, ACC in which a curve ahead of a target vehicle is detected by using a navigation system, to thereby automatically decelerate at the curve has also been developed. In the system as described above in which a vehicle is controlled and a warning is issued to a driver on the basis of not only the traveling condition of the target vehicle but also information of a road shape and the like, there is a problem that a gap in control and warning timing occurs due to influences of a detection error in the road shape, a change in the road shape caused by construction work, a calculation error in the distance between the target vehicle and the road shape such as a curve, and the like. For this reason, a technology for measuring a road shape in real time and with high accuracy is important.

Here, there is disclosed a technology in which stationary objects are detected by using a millimeter wave radar, and only a stationary object which is useful to estimate a road shape is selected from the detected stationary objects by using previous processing results and a yaw rate sensor or a steering angle sensor, to thereby estimate a curve (see Patent Literature 1). In this regard, instead of using the previous processing results, there is an alternative method in which a plurality of road shapes are assumed, useful stationary objects are selected for each road shape, and a result for which the largest number of stationary objects are selected is selected as the stationary object useful to estimate the road shape.

CITATION LIST

Patent Literature

Patent Literature 1: JP Patent Publication (Kokai) No. 2007-66047 A

SUMMARY OF INVENTION

Technical Problem

However, the method disclosed in Patent Literature 1 has the following problem. That is, a three-dimensional object is selected merely on the basis of the road shape in the previous processing results, and hence in the case where the road shape is discontinuous or in the case where the road shape is incorrectly estimated in the previous processing, it is difficult to estimate the road shape with excellent accuracy. In addition, instead of selecting the stationary object on the basis of the previous road shape, the process of selecting the stationary object is performed for the plurality of road shapes, and the stationary object when the largest number of stationary objects are selected is determined as useful one. Therefore, it is necessary to perform the three-dimensional object selection process the number of times corresponding to the plurality of road shapes. In addition, there is a problem that an incorrect stationary object may be selected in a traveling environment which includes a large number of three-dimensional objects in addition to three-dimensional objects along the road shape.

In view of the above, the present invention has an object to provide a traveling environment recognition device which is capable of estimating a road shape with high accuracy even in a place which is too far to see objects constituting the road such as a traffic lane and a curb.

Solution to Problem

In order to solve the above-mentioned problems, one of the desirable aspects of the present invention is as follows.

A traveling environment recognition device including: a measurement unit which measures a target object; an object detection unit which detects an object on the basis of a signal acquired by the measurement unit; a road shape prediction unit which predicts a road shape on which a target vehicle is traveling; a three-dimensional object selection unit which selects, from among the objects detected by the object detection unit, only a three-dimensional object within a predetermined range from a point of the road predicted by the road shape prediction unit; and a road shape estimation unit which estimates the road shape on the basis of position information of the three-dimensional object selected by the three-dimensional object selection unit.

Advantageous Effects of Invention

According to the present invention, it is possible to provide a traveling environment recognition device which is capable of estimating the road shape with high accuracy even in the place which is too far to see the objects constituting the road such as the traffic lane and the curb.

DESCRIPTION OF EMBODIMENTS

Hereinafter, an embodiment is described with reference to the drawings.

Figure 1:
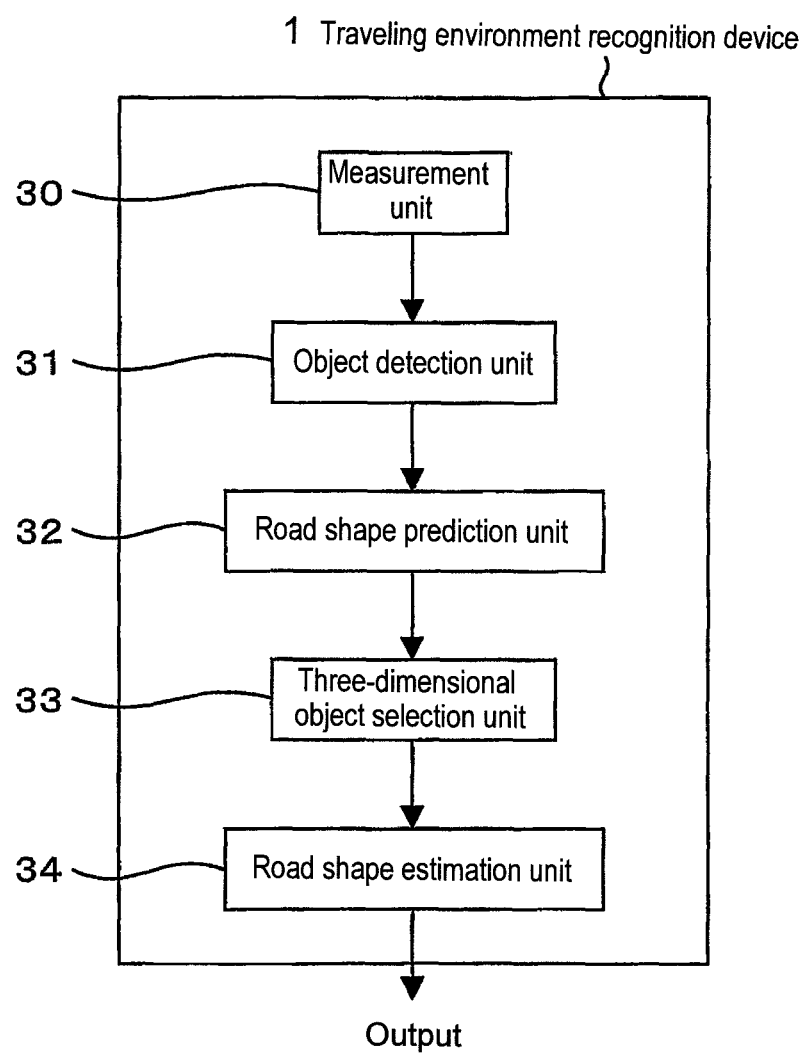
FIG. 1 is a functional block diagram illustrating a traveling environment recognition device 1.
Figure 2:
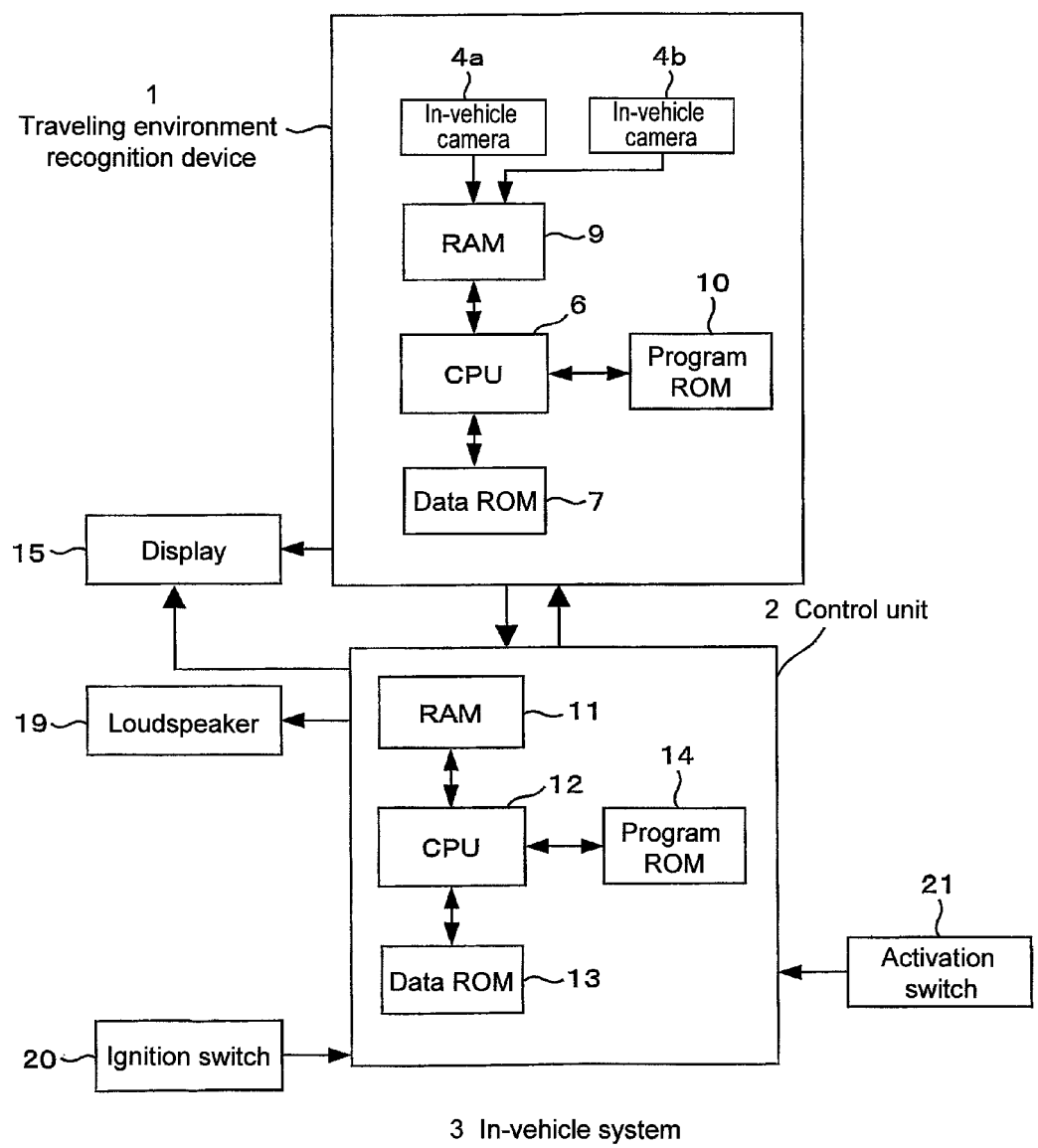
FIG. 2 is a configuration diagram illustrating an in-vehicle system including the traveling environment recognition device.

For a traveling environment recognition device 1, a measurement apparatus as illustrated in FIG. 1 is formed of two cameras, and is applied to the traveling environment recognition device 1 as illustrated in FIG. 2.

The traveling environment recognition device 1 implements a function of recognizing an environment around a vehicle by means of a camera (image unit) 4a and a camera 4b. At this time, three or more cameras may be provided. In addition, it is also possible to adopt a configuration in which a control unit 2 as a separate member from the cameras, an image processing unit (not shown), or the like takes in images from the camera 4a and the camera 4b to process the images.

Figure 3:
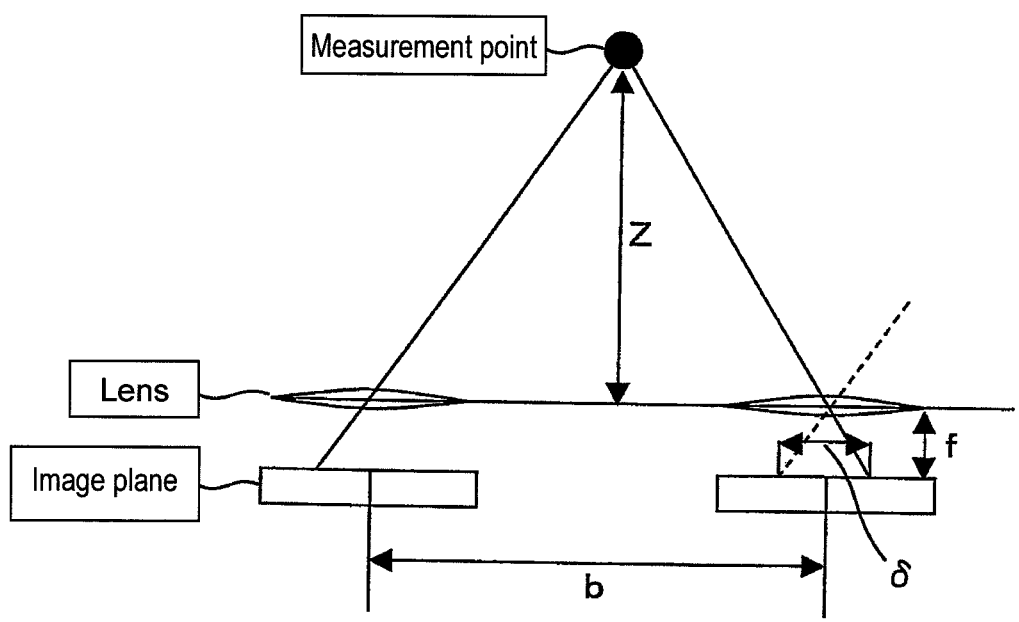
FIG. 3 is a view illustrating the principle of a stereo camera.

Here, the traveling environment recognition device 1 uses a difference in vision (hereinafter, parallax) which is caused when an image of the same measurement point is imaged by a plurality of cameras as illustrated in FIG. 3, and thus can obtain a distance on the principle of triangulation. For example, assuming that a distance to a target is Z, a distance between the cameras is B, a focal length of the camera is f, and a parallax is δ, the distance Z can be obtained by Expression 1.

$$Z = \frac{B \times f}{\delta}$$  Expression 1

The traveling environment recognition device 1 is mounted on a vehicle and is applied to an in-vehicle system 3 illustrated in FIG. 2. The in-vehicle system 3 is an apparatus in which the traveling environment recognition device 1 detects a traffic lane and a three-dimensional object which exist ahead of this vehicle (hereinafter, referred to as target vehicle), transmits the detection results to the control unit 2, and controls the vehicle or warns a person in the vehicle of danger on the basis of the detection results.

The traveling environment recognition device 1 in this example includes a CPU 6, a RAM 9, a program ROM 10, and a data ROM 7 in addition to the camera 4a and the camera 4b. In addition, the control unit 2 includes a CPU 12, a RAM 11, a program ROM 14, and a data ROM 13. Then, in the in-vehicle system 3, the traveling environment recognition device 1 and the control unit 2 are connected to each other, and a display 15, a loudspeaker 19, an ignition switch 20, and an activation switch are further connected thereto. The display 15 is set in a vehicle room and displays various images and various pieces of information. The loudspeaker 19 issues a warning sound when there is a danger that the target vehicle will collide with an obstacle. The ignition switch 20 is turned on at the start of an engine. The activation switch serves to activate the system. The control unit 2 controls an operation of the entire in-vehicle system, including the display control of the display 15.

The traveling environment recognition device 1 is attached to, for example, a rearview mirror part in the target vehicle room, and takes images of the state ahead of the target vehicle at a predetermined depression angle and a predetermined attachment position. The images ahead of the target vehicle which are taken by the camera 4a and the camera 4b (hereinafter, referred to as picture images) are taken into the RAM 9 included in the traveling environment recognition device 1. A traffic lane and a three-dimensional object ahead of the target vehicle are detected, and the road shape is estimated. Then, the detection results are drawn on a displayed image, or if the control unit 2 judges that there is a danger that the speed of the target vehicle is too fast for the estimated road shape and the target vehicle may deviate from the road, a driver is warned thereof under the control of the control unit 2 by means of both of the display 15 and the loudspeaker 19 or any one of the display 15 and the loudspeaker 19. Alternatively, the vehicle may be controlled by the control unit 2 so that the danger is avoided or reduced.

The display 15 is formed of, for example, a display device such as a LCD (Liquid Crystal Display), and displays, for example, various images such as an image of traveling route guidance by a navigation system (not shown) and an image of the traveling environment recognition device 1 under the display control of the control unit 2. In addition, when the traveling environment recognition device 1 recognizes a sharp curve or the like, the display 15 displays a massage to the effect that the sharp curve or the like exists, under the control of the control unit 2.

The control unit 2 has a configuration in which the CPU 12, the RAM 11, the data ROM 13, and the program ROM 14 are connected to each other via a bus, and the CPU 12 executes various control programs stored in the program ROM 14, whereby the operation of the entire system is controlled.

In the traveling environment recognition device 1, the program ROM 10 has stored therein a traveling environment recognition program for detecting a traffic lane, a three-dimensional object, and the like and for estimating a road shape, and when the engine is started, the CPU 6 executes this program, whereby a traveling environment recognition function is implemented. As a result, the traveling environment recognition device 1 functions as an object detection unit 31, a road shape prediction unit 32, a three-dimensional object selection unit 33, and a road shape estimation unit 34 as in a functional block diagram of FIG. 1.

The object detection unit 31 has a function of processing images taken by the camera 4a and the camera 4b corresponding to the measurement unit 30, and detecting a road surface marking such as a traffic lane and three-dimensional objects such as a curb, a tree, and a building.

The road shape prediction unit 32 has a function of predicting a far road shape on the basis of the traffic lane detected by the object detection unit 31. This prediction may be based on three-dimensional objects constituting the road such as a guardrail and a curb in addition to the traffic lane, and hence there is no restriction that the traffic lane must be used.

The three-dimensional object selection unit 33 has a function of selecting a three-dimensional object near the road shape predicted by the road shape prediction unit 32.

The road shape estimation unit 34 has a function of using three-dimensional position information of the three-dimensional object selected by the three-dimensional object selection unit 33 and information of the traffic lane used when the road shape prediction unit 32 predicts the road shape, to thereby obtain the road shape again.

In the traveling environment recognition device 1 configured as described above, the CPU 6 executes the traveling environment recognition program. Accordingly, it is possible to correctly select a three-dimensional object such as a tree or a building existing along the road even in a place which is too far to see objects constituting the road shape such as a traffic lane and a curb, and utilize position information of the selected three-dimensional object, whereby the road shape can be estimated with excellent accuracy from the near side to the far side. Then, an image or the like obtained by superimposing recognition results to the input image is outputted to the display 15, and the recognition results are transmitted to the control unit 2. If it is judged under the control of the control unit 2 that there is a danger, deceleration control is performed, or a warning sound is issued to thereby inform a person in the vehicle. When this deceleration control is performed, an engine brake or a regenerative brake is used, and if a traveling road is an upward slope or a portion ahead of the traveling road is an upward slope, the deceleration control is not performed, whereby fuel efficiency can be improved.

Here, in the traveling environment recognition device 1 as described above, a flow of a series of processing in which an image is taken, a road shape is estimated, and then the results are outputted is described with reference to a flow chart.

Figure 4:
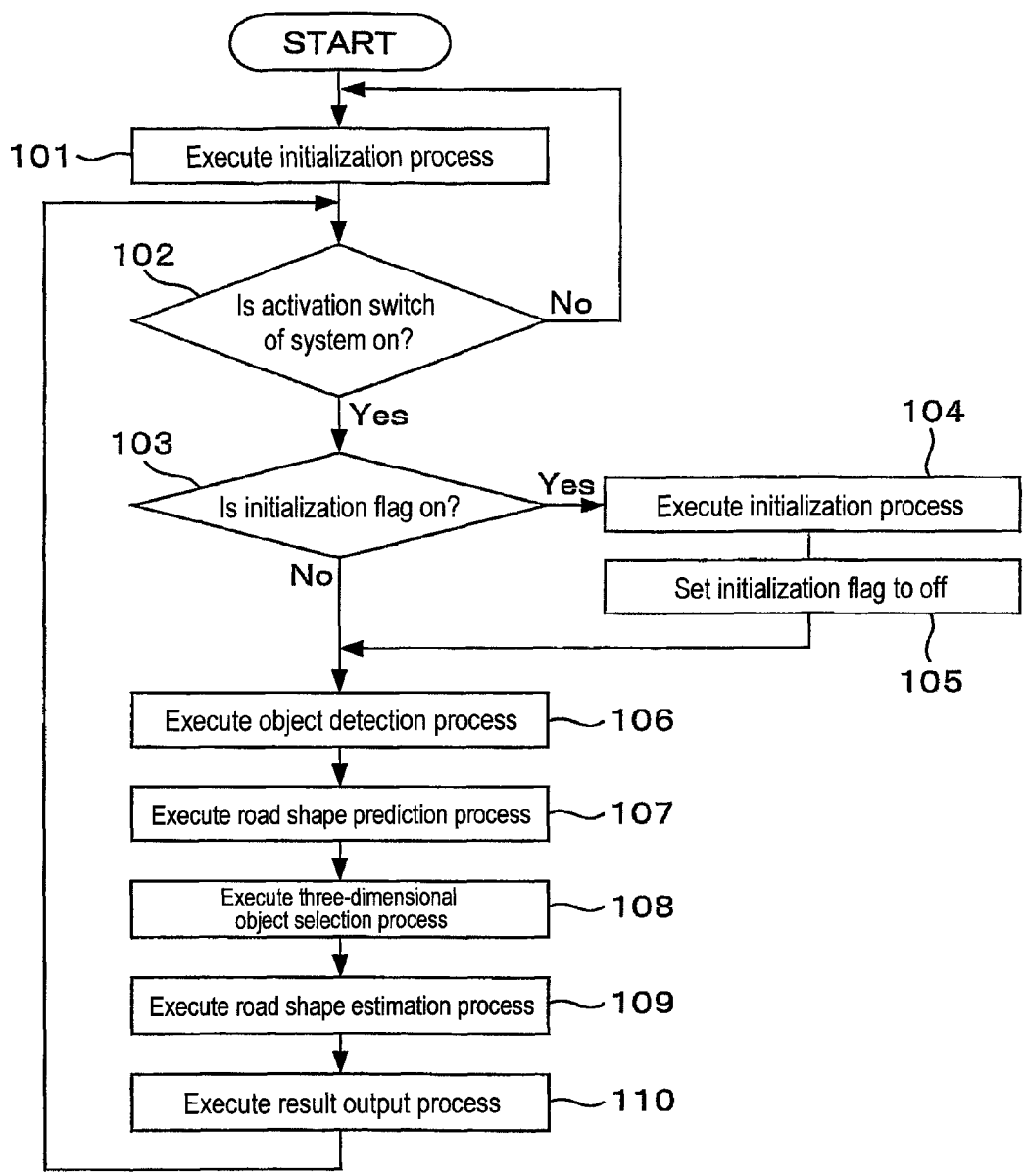
FIG. 4 is a flow chart showing a traveling environment recognition function.

A series of processing shown in FIG. 4 is started when the ignition switch 20 is turned on, and is repeatedly performed until the ignition switch 20 is turned off. This series of processing is performed irrespective of whether the target vehicle is traveling or stopped and whether an image displayed on the display 15 is a traveling route guidance image of the navigation system or another picture. However, whether to perform the processing may be decided in accordance with whether the target vehicle is traveling or stopped and whether the image displayed on the display 15 is the traveling route guidance image of the navigation system or another picture.

First, when the ignition switch 20 is turned on, the traveling environment recognition device 1 executes the traveling environment recognition program, to thereby execute an initialization process (Step 101). In the initialization process, an initialization flag is set to ON. Next, it is determined whether or not the activation switch 21 of the system is on (Step 102). When the activation switch 21 of the system is turned on, it is determined whether or not a processing region initialization flag is on (Step 103). If the initialization flag is on, the initialization process is executed (Step 104). Then, the initialization flag is set to OFF (Step 105).

Figure 5:
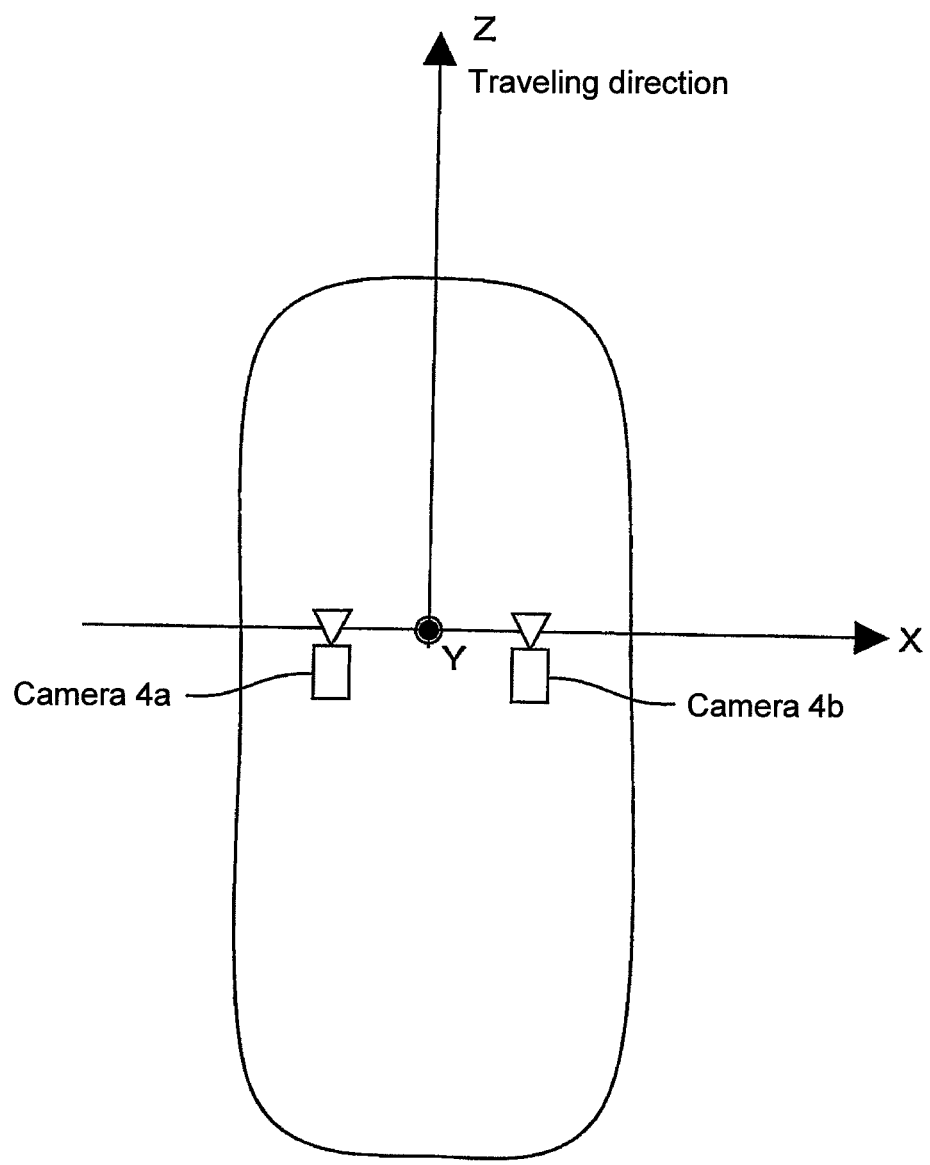
FIG. 5 is a view illustrating a coordinate system of a three-dimensional position of an object.

After that, the object detection unit detects an object such as a traffic lane, a curb, a guardrail, a building, or a tree, and the distance thereto is calculated on the basis of a difference in vision between the camera 4a and the camera 4b, to thereby obtain a three-dimensional position of the object (Step 106). It should be noted that the three-dimensional coordinate system at this time is expressed by, for example, a Cartesian coordinate system in which a middle point between the camera 4a and the camera 4b is set to the origin and a target vehicle traveling direction, a horizontal direction, and a vertical direction are Z, X, and Y, respectively, as illustrated in FIG. 5. With regard to the traffic lane and the three-dimensional object, for example, the object detection unit analyzes three-dimensional data which can be obtained by processing images taken by the camera 4a and the camera 4b, and thus can detect a vertical structure as the three-dimensional object and a white line existing horizontally and continuously as the traffic lane. When two or more cameras (hereinafter, referred to as stereo camera) are used, high-resolution three-dimensional data can be obtained, and hence it is possible to detect small targets such as the traffic lane and the curb with high accuracy except a far region in which the resolution becomes lower. In addition, unlike a radar, in the stereo camera, detection performance for a three-dimensional object does not depend on reflection characteristics of a target object. Therefore, a wide variety of objects such as a plant and a building can be detected, and also with regard to objects along the road shape, a larger number of targets can be detected.

Then, in Step 106, a list of position information of N points, that is, $LL=\{(X_1, Z_1), (X_2, Z_2), \ldots, (X_N, Z_N)\}$ is created from, for example, the detected traffic lane, and a quadratic function of Expression 2 given below is applied thereto according to a least-squares method or the like.

$$X = a \times Z^2 + b \times Z + c \quad \text{(Expression 2)}$$

Figure 6:
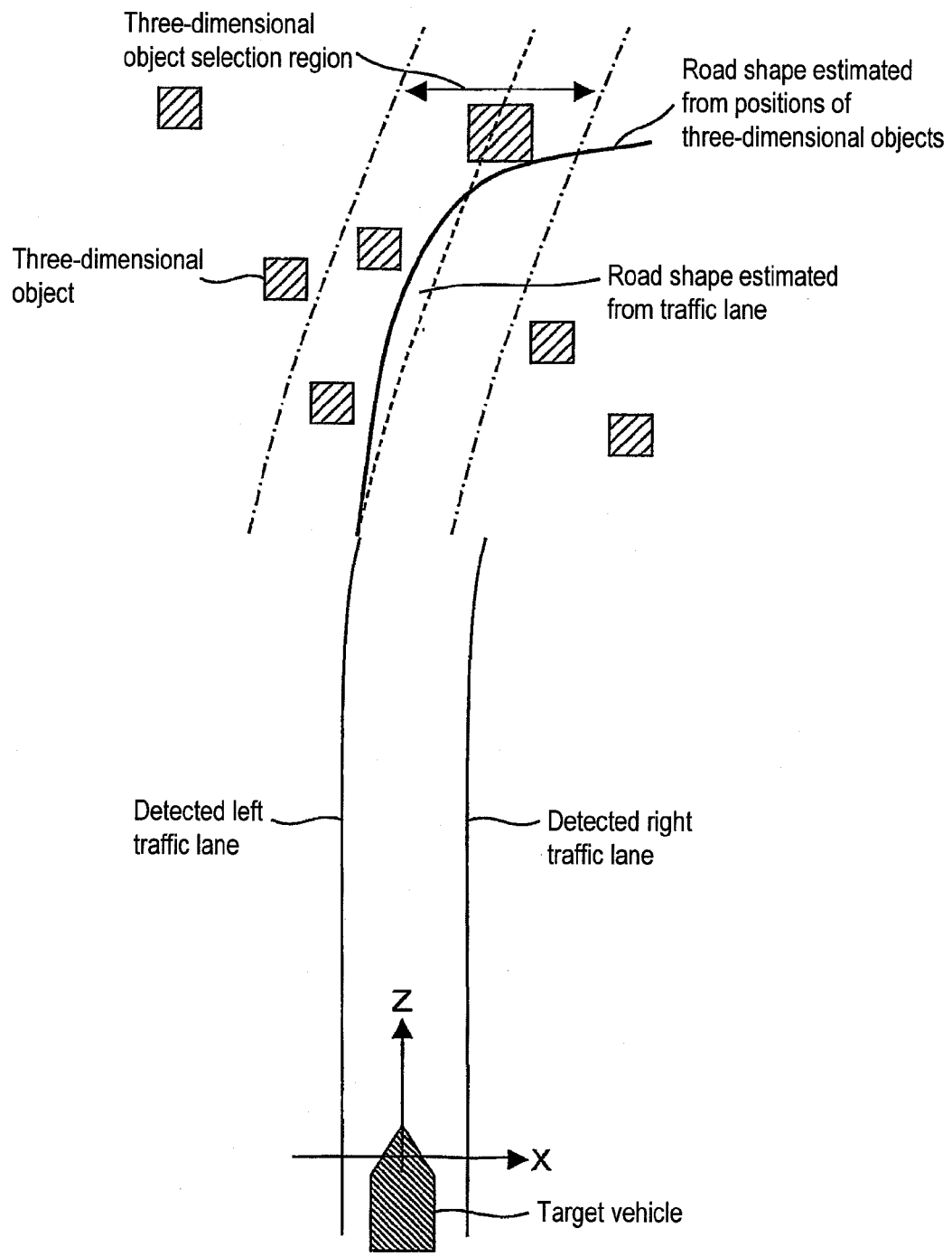
FIG. 6 is a view illustrating a process of estimating a shape of a curve in a series of processing of the traveling environment recognition function.
Figure 7:
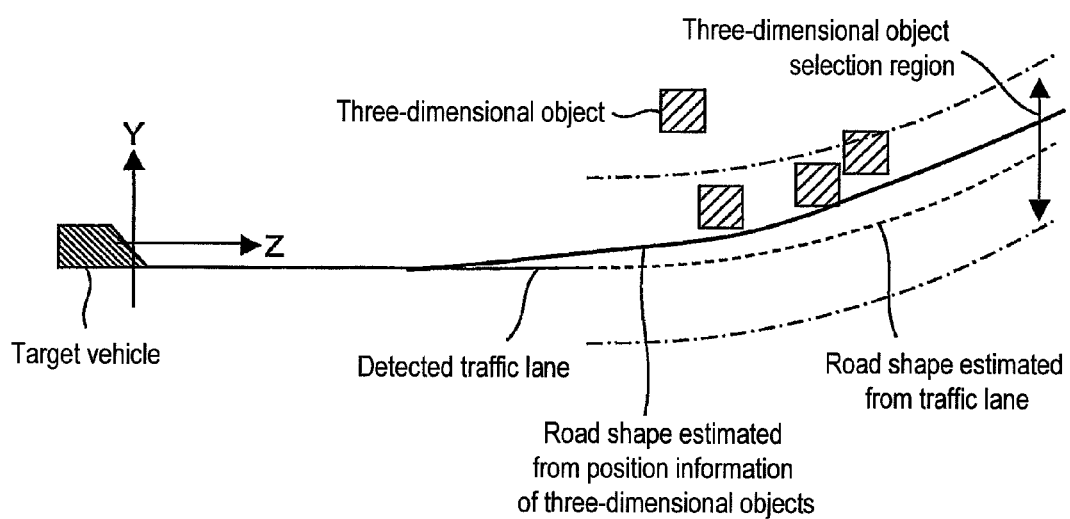
FIG. 7 is a view illustrating a process of estimating a gradient of a road in the series of processing of the traveling environment recognition function.
Figure 8:
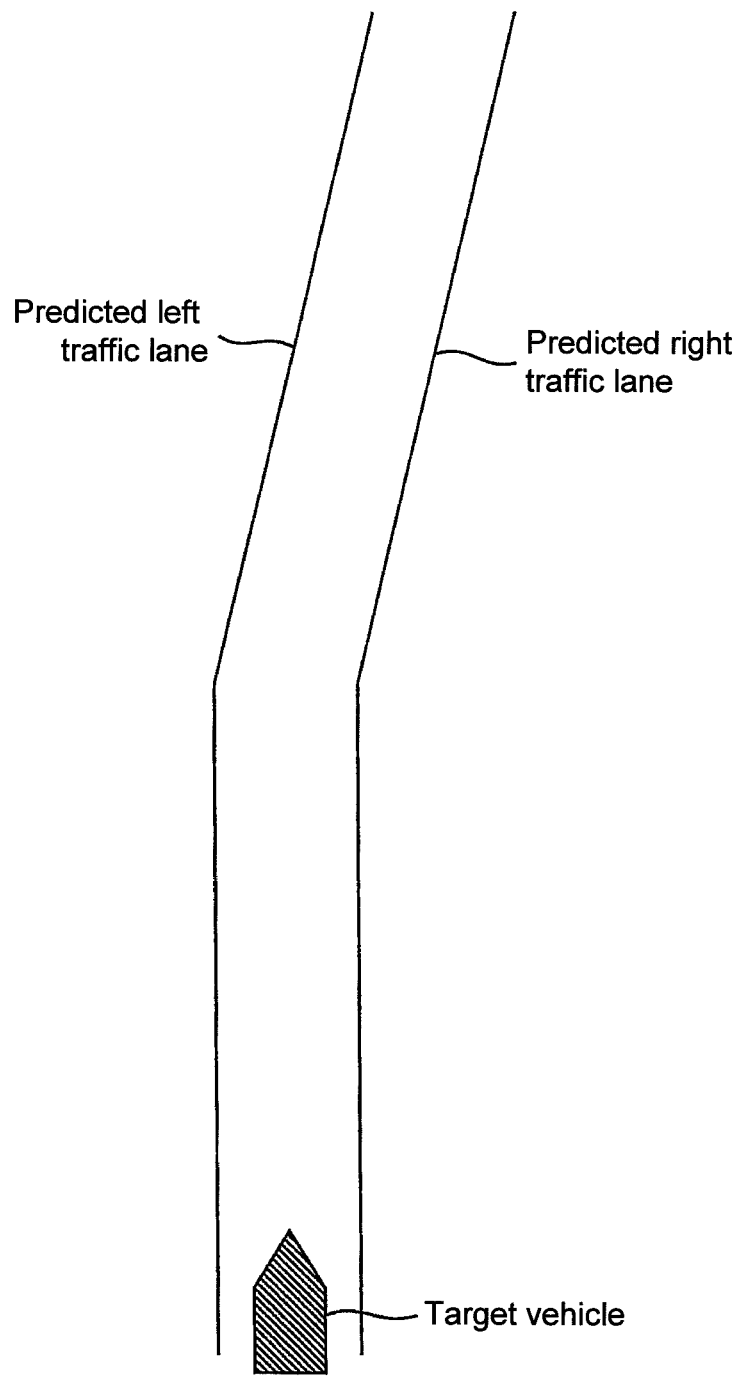
FIG. 8 is a view illustrating an example in which the shape of the curve is expressed by a combination of two straight lines.
Figure 9:
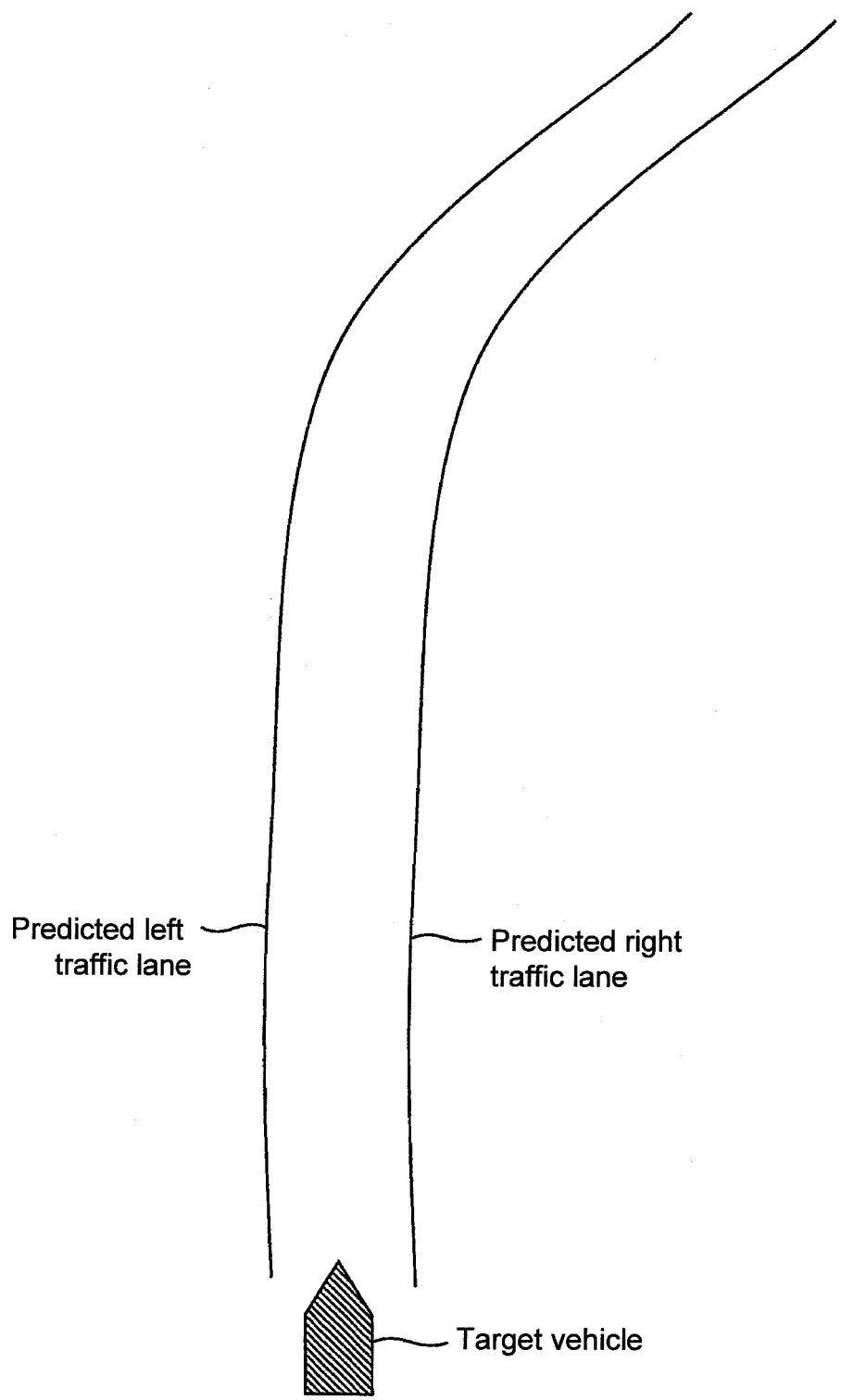
FIG. 9 is a view illustrating an example in which the shape of the curve is expressed by curved lines.

In this way, the road shape is predicted (Step 107). At this time, the road shape may be predicted on the basis of a straight line, a polynomial, the combination of a plurality of straight lines, the combination of polynomials, and the like in addition to the quadratic function. In addition, at this time, as illustrated in FIG. 6, when the road shape is predicted in an X-Z coordinate system in which the road is viewed from directly above, a curve can be predicted. As illustrated in FIG. 7, when the road shape is predicted in a Y-Z coordinate system in which the road is viewed directly from the side, a gradient can be predicted. FIG. 8 illustrates an example in which the road shape of the curve is predicted by two straight lines, and FIG. 9 illustrates an example in which the road shape of the curve is predicted by a polynomial representing curved lines. In addition, the road shape prediction unit may predict the road shape on the basis of objects constituting the road shape such as a curb, a guardrail, a central reservation, and a border between asphalt and a road end, instead of the position information of the traffic lane. Further, for the prediction of the road shape, a map database and a GPS of the navigation system (not shown) may be used instead of the detection results in Step 106, and the road shape on which the target vehicle is traveling may be acquired and predicted from the map database. At this time, if the road shape is predicted by using the stereo camera, unlike a monocular camera and the like, three-dimensional positions of a traffic lane, a curb, and the like can be obtained, and hence the road shape can be predicted with more excellent accuracy.

Then, a three-dimensional object selection region (FIG. 6 and FIG. 7) obtained by defining a predetermined range in the road shape predicted in Step 107 is set, and an object within the set region is selected, whereby a list of position information of M points in the three-dimensional objects, that is, $RL=\{(X_1', Z_1'), (X_2', Z_2'), \ldots, (X_M', Z_4')\}$ is obtained (Step 108). At this time, toward a farther place, the prediction accuracy becomes lower, and the detection accuracy of the three-dimensional object becomes lower. Therefore, the region in which the three-dimensional object is selected may be set to be larger toward the farther place. In addition, in a near place, the stereo camera can detect a three-dimensional object along the road such as a building as well as objects constituting the road shape such as a traffic lane and a curb. Therefore, a difference between position information of the traffic lane and the curb and position information of the three-dimensional object along the road is obtained in the near place, and the three-dimensional object selection region can be set in consideration of the difference between the position information of the traffic lane and the position information of the three-dimensional object along the road. This makes it possible to correctly select the three-dimensional object even in a wide road with a large number of traffic lanes. Further, the three-dimensional object is selected from the objects actually constituting the road shape such as the traffic lane and the curb, on the basis of the predicted road shape, whereby the three-dimensional object along the road shape can be selected with high accuracy.

Figure 10:
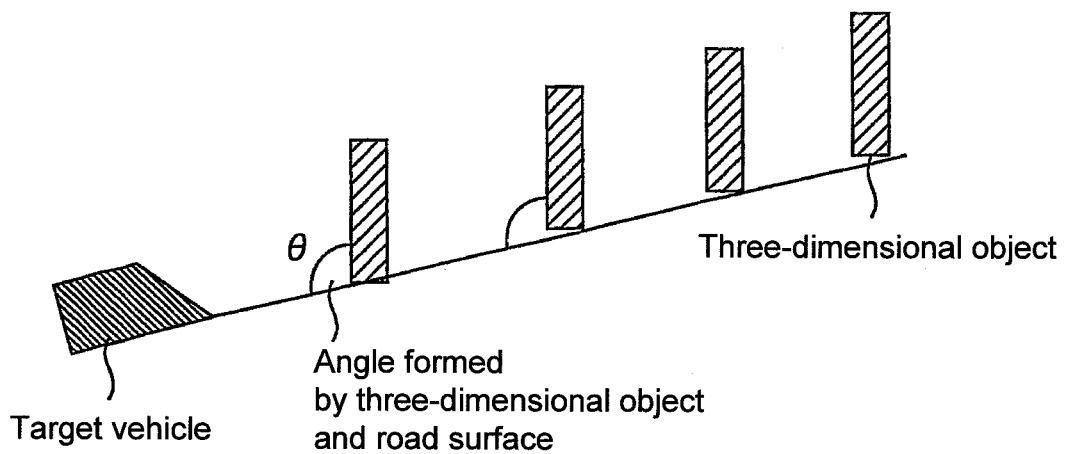
FIG. 10 is a view illustrating a method in which the gradient of the road is calculated even when a target vehicle is traveling.

Further, in Step 109, the application of the quadratic function or the like is performed by using: the list LL of the position information of the traffic lane which is used for predicting the road shape in Step 107; and the list RL of the position information of the three-dimensional object selected in Step 108, to thereby estimate the road shape. Alternatively, the application of the quadratic function or the like may be performed by using only the list RL of the position information of the three-dimensional object selected in Step 108. Still alternatively, Steps 108 and 109 may be repeated a plurality of times, that is, a three-dimensional object is selected again by using results of the application of the quadratic function and the like using the list RL, and the quadratic function and the like are applied thereto again. In the prediction of the road shape in Step 107, the road shape toward the far place is predicted on the basis of the traffic lane and the like in the near place, and when the road shape is estimated by adding the position information of the far three-dimensional object, the estimation results with reduced errors can be obtained even in the far place. The stereo camera has a high resolution of three-dimensional data, and can detect a wide variety of three-dimensional objects, and hence a larger number of three-dimensional objects can be utilized. In addition, even when the target vehicle is traveling on a sloping road as illustrated in FIG. 10, a gradient of the sloping road on which the target vehicle is currently traveling can be obtained by calculating an angle θ formed by a road surface and a vertical three-dimensional object. In particular, the stereo camera has high resolution, and hence the angle θ formed by the road surface and the vertical three-dimensional object can be calculated with excellent accuracy.

Next, in Step 110, at least one of the following values is outputted: results obtained by calculating, from the estimated road shape, a distance to a curve, a radius of the curve, a distance to a slope, an angle of a gradient, a height of a three-dimensional object at a road end, and the like; a type of the three-dimensional object; a position and a relative speed of a vehicle ahead, an oncoming vehicle, and a stationary vehicle; a type of a traffic lane; and the like.

On the basis of the road shape estimation results obtained as described above, the control unit 2 decides the contents of control and warning, and then performs: a process of controlling the vehicle or issuing a warning to a person in the vehicle; or a process of controlling the vehicle and issuing the warning to the person in the vehicle. The processing therefor is described with reference to a flow chart of FIG. 11. Here, description is given of an example in which a proper vehicle speed is obtained in accordance with the road shape, and a deceleration/warning process is performed, but a process of, for example, automatically making a turn in accordance with the road shape may be performed.

Figure 11:
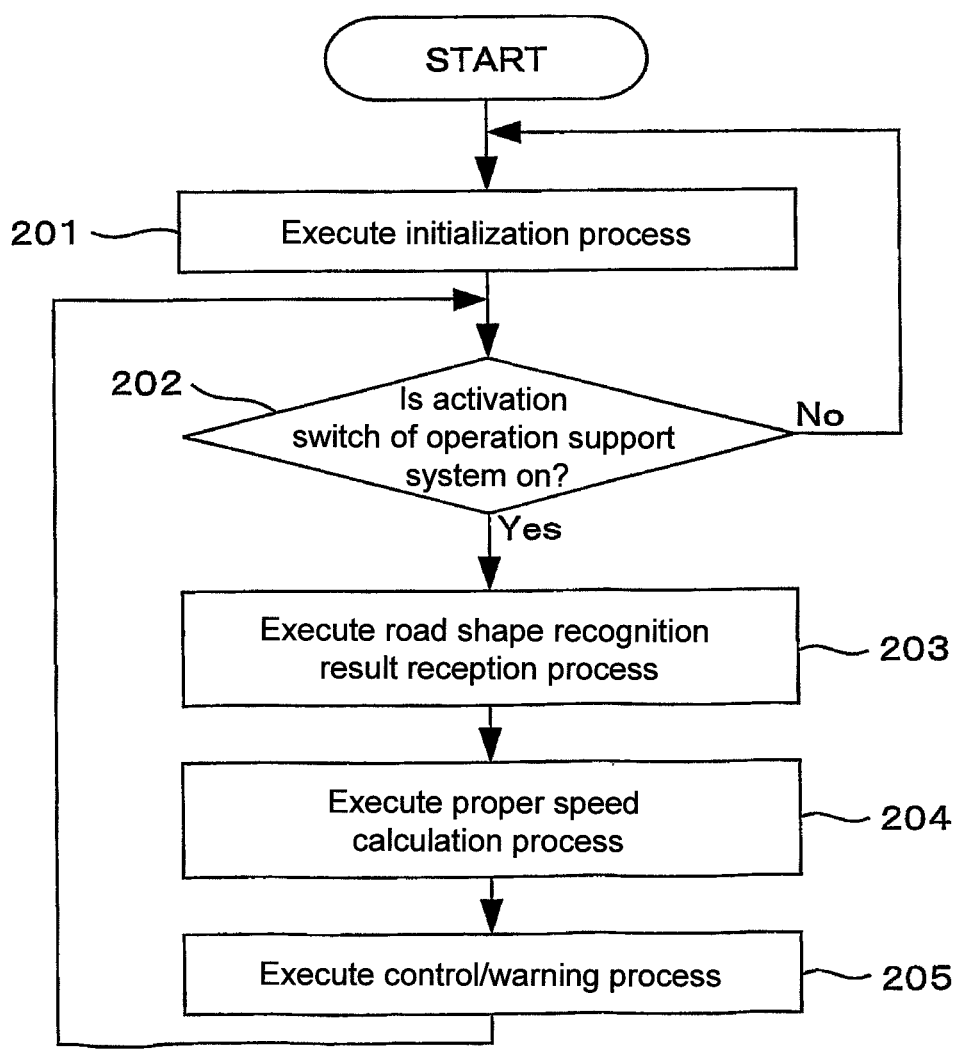
FIG. 11 is a flow chart showing a vehicle control function and a warning function of a control unit.
Figure 12:
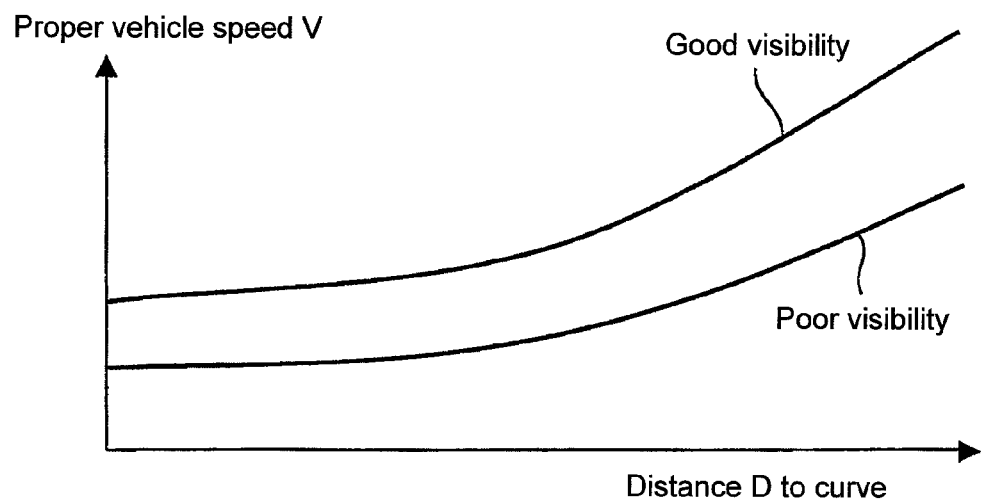
FIG. 12 is a graph showing a method of calculating a proper speed of the control unit.
Figure 13:
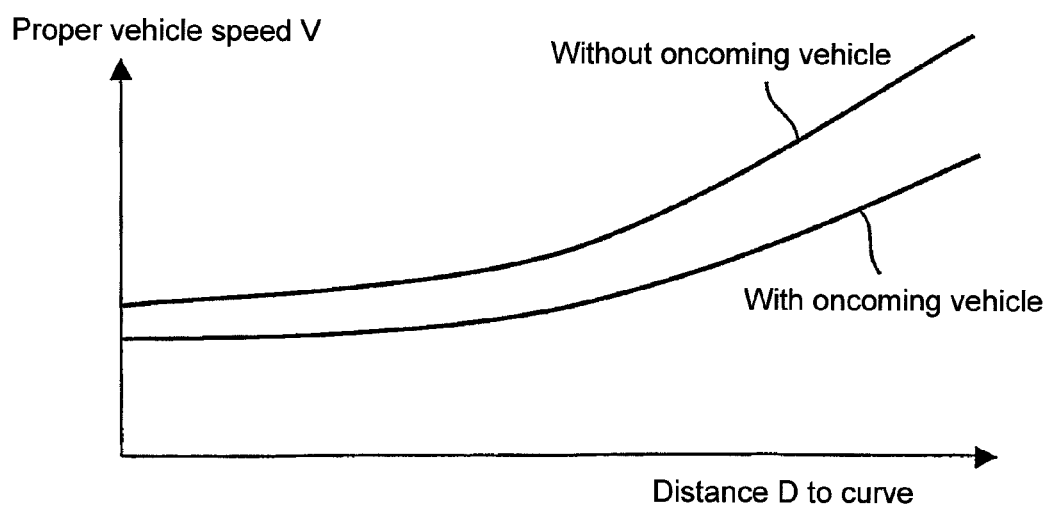
FIG. 13 is a graph showing the method of calculating the proper speed of the control unit.
Figure 14:
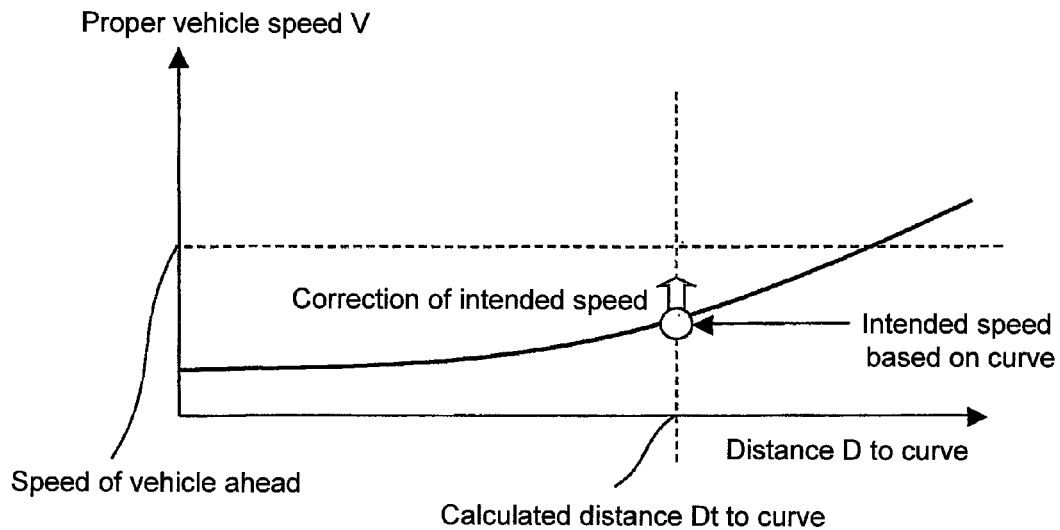
FIG. 14 is a graph showing the method of calculating the proper speed of the control unit.
Figure 15:
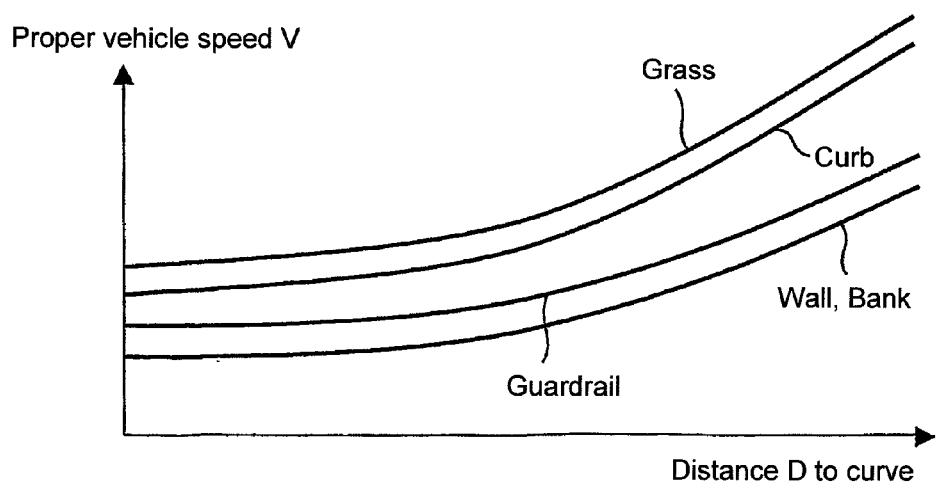
FIG. 15 is a graph showing the method of calculating the proper speed of the control unit.
Figure 16:
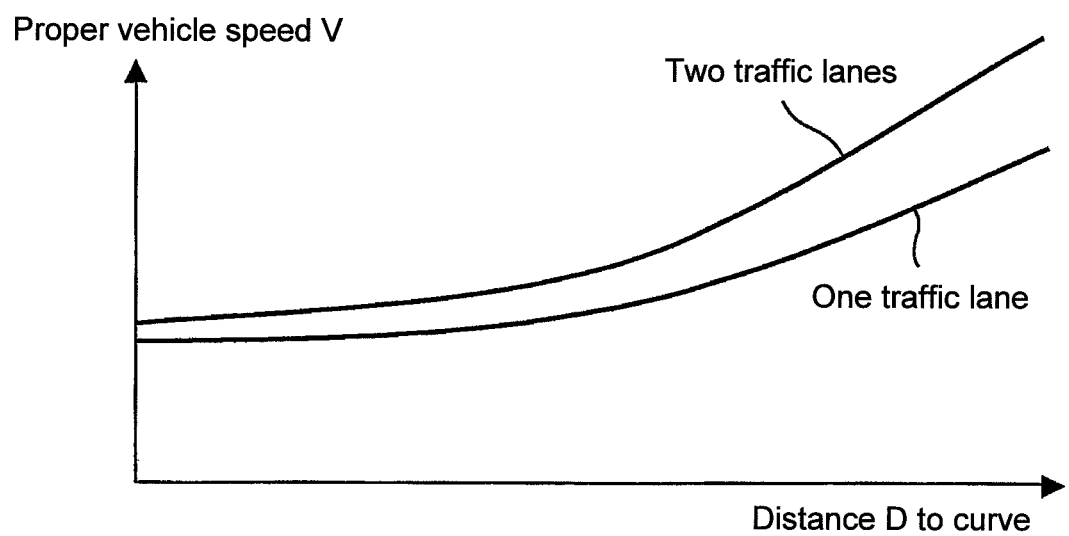
FIG. 16 is a graph showing the method of calculating the proper speed of the control unit.

A series of processing shown in FIG. 11 is started when the ignition switch 20 is turned on, and is repeatedly performed until the ignition switch 20 is turned off. This series of processing is performed irrespective of whether the target vehicle is traveling or stopped and whether an image displayed on the display 15 is a traveling route guidance image of the navigation system or another picture. However, whether to perform the processing may be decided in accordance with whether the target vehicle is traveling or stopped and whether the image displayed on the display 15 is the traveling route guidance image of the navigation system or another picture.

First, when the ignition switch 20 is turned on, the control unit 2 executes an operation support program, to thereby execute an initialization process (Step 201). At this time, various programs such as a navigation program may be executed simultaneously. Next, it is determined whether or not the activation switch 21 of the system is on (Step 202). Then, when the activation switch 21 of the system is turned on, a road shape recognition result reception process is executed, and information of the road shape is stored in the RAM 11 (Step 203).

Next, in Step 204, a proper speed suited to the road shape is calculated. For example, in the case of a curve, as shown in FIG. 12 to FIG. 16, a proper vehicle speed is set in advance in accordance with the road shape, whereby the proper vehicle speed suited to the road shape can be obtained. In an example of FIG. 12, when visibility is good, the proper vehicle speed is set to be higher than when the visibility is poor. In an example of FIG. 13, when there is not any oncoming vehicle, the proper vehicle speed is set to be higher than when there is an oncoming vehicle. In an example of FIG. 14, when a vehicle ahead exists, the proper vehicle speed is corrected so as to approach the speed of the vehicle ahead. In an example of FIG. 15, the proper vehicle speed is decided on the basis of whether the type of a three-dimensional object nearest the target object among three-dimensional objects existing by the side of the road is grass, a curb, a guardrail, a wall, or a bank. In an example of FIG. 16, the proper vehicle speed is decided in accordance with the number of traffic lanes on the road. Alternatively, the proper vehicle speed may be decided in accordance with whether the traffic lane is marked by a solid line, a broken line, or a double line or no line is marked for the traffic lane. The traveling environment recognition device described above utilizes the results obtained by utilizing the position information of the three-dimensional object and thus estimating the road shape toward the far place with high accuracy, whereby an intended vehicle speed suited to the road shape can be obtained in real time. Further, the stereo camera and the like can discriminate the type of a three-dimensional object existing by the side of the road, the number of traffic lanes, and the like as well as the road shape. Therefore, information of the type of the three-dimensional object existing by the side of the road, the number of traffic lanes, and the like as well as the road shape can be also utilized, to thereby calculate an intended vehicle speed more suited to the traveling road.

Then, in Step 205, the proper vehicle speed obtained in Step 204 and the speed of the target vehicle are compared with each other. If the speed of the target vehicle is higher, the deceleration control is performed by using at least any one of a brake, an engine brake, and a regenerative brake, and alternatively, a message, a sound, or an alert for warning a driver of the overspeed is issued. At this time, the deceleration control and the warning may be performed simultaneously. In addition, the warning is issued to a person in the vehicle by using any one of the display and the loudspeaker or both of the display and the loudspeaker. It should be noted that the warning may be issued by vibrating a seat belt, an accelerator, a brake pedal, a steering wheel, a seat, and the like in addition to the warning using the display and the loudspeaker.

As described hereinabove, the traveling environment recognition device 1 processes images taken by the cameras 4a and 4b, predicts the road shape from objects constituting the road such as a traffic lane and a curb, and correctly selects three-dimensional objects including a building, a tree, and the like existing along the road, on the basis of the results predicted by using the traffic lane and the like constituting the road shape. With this configuration, position information of other three-dimensional objects as well as a white line, the curb, and the like can be utilized, and hence highly accurate road shape estimation can be realized. In particular, the use of the stereo camera enables not only the detection of the traffic lane and the curb but also the acquisition of the three-dimensional positions thereof. Therefore, the road shape can be predicted with excellent accuracy, and a wide variety of three-dimensional objects including a plant can be detected, so that the position information of a large number of three-dimensional objects can be utilized.

In addition, the road shape estimation unit of the traveling environment recognition device 1 calculates a distance between an object constituting the road such as a traffic lane and an object existing along the road such as a building, and corrects the position information of the three-dimensional objects used for estimating the road shape, whereby it is possible to absorb position errors of the object constituting the road shape such as the traffic lane and the object existing along the road such as the building. Therefore, the road shape can be estimated with more excellent accuracy. Alternatively, instead of calculating the distance between the object constituting the road such as the traffic lane and the object existing along the road such as the building, the number of traffic lanes existing on the left side of a target vehicle traveling lane and the number of traffic lanes existing on the right side thereof are obtained, and the position information of the three-dimensional objects used for estimating the road shape may be corrected in accordance with the number of traffic lanes.

It should be noted that a car navigation system and a map database may be provided, and a road type, for example, whether a road on which the target vehicle is currently traveling is an express highway or a general road, may be determined on the basis of a target vehicle position obtained from the car navigation system and map data obtained from the map database. Then, whether the road is represented by a quadratic function or a cubic function may be decided on the basis of the road type and the like.

In addition, the series of processing or a part of the processing in the traveling environment recognition device 1 may be performed by the control unit 2 or another processing apparatus (not shown), and the processing in the control unit 2 may be performed by the traveling environment recognition device 1.

In the above, description is given of an example in which the two cameras are used as the measurement unit, but only one camera, a laser radar, a millimeter wave radar, an ultrasonic sensor, and the like may be used, or the combination of the camera, the laser radar, the millimeter wave radar, the ultrasonic sensor, and the like may be used. For example, a monocular camera and a radar are combined with each other, a traffic lane is detected by the monocular camera, and a three-dimensional object is detected by the radar, whereby the processing similar to the above can be realized.

Further, in addition to a curve and a gradient, the road shape such as a bank can be estimated by performing not only fitting of the road shape on a two-dimensional plane such as an X-Z plane and a Y-Z plane but also fitting of a plane and a curved plane in an X-Y-Z space.

In the present embodiment, the object selection unit selects three-dimensional objects including an obstacle such as a parked vehicle. Then, if an obstacle such as a parked vehicle exists on the road, a route passing on the near side of the parked vehicle may be estimated as the road shape. Alternatively, if a parked vehicle exists on the road, the three-dimensional object selection unit discriminates whether or not a three-dimensional object on the road is the parked vehicle, and selects three-dimensional objects so as to exclude the parked vehicle, whereby the original road shape may be estimated. Further, the three-dimensional object selection unit selects three-dimensional objects so as to exclude a moving object such as a vehicle ahead. Accordingly, even if the vehicle ahead and the like exist on the road, the road shape can be correctly estimated.

The road shape is detected on the basis of at least one of a distance to a curve, a radius of the curve, a curvature, a tangent angle of the curve, a distance to a slope, and an angle of the slope, which are outputted by the traveling environment recognition device, and a proper speed for traveling on the detected road shape is calculated, which enables vehicle control and a warning process suited to the road shape.

According to the present embodiment, even in a place which is too far to see objects constituting the road such as a traffic lane and a curb, three-dimensional objects used for estimating the road shape are selected from three-dimensional object data containing arbitrary three-dimensional objects such as a tree and a building, on the basis of road shape prediction results. Accordingly, even in the case where the road shape is unknown, even in the case where the previous processing results are incorrect, and even under the traveling environment where a large number of three-dimensional objects other than three-dimensional objects along the road exist, only three-dimensional objects near the road shape can be selected, so that the road shape can be estimated with high accuracy.

REFERENCE SIGNS LIST 1 traveling environment recognition device
2 control unit
3 in-vehicle system
4a, 4b camera
6, 12 CPU
7, 13 data ROM
9, 11 RAM
10, 14 program ROM
15 display
19 loudspeaker
20 ignition switch
21 activation switch
30 measurement unit
31 object detection unit
32 road shape prediction unit
33 three-dimensional object selection unit
34 road shape estimation unit

The invention claimed is:

1. A traveling environment recognition device including a processor, comprising:
   a measurement unit which measures a target object, wherein the measurement unit corresponds to at least one of an image pick-up unit, a laser radar, a millimeter wave radar, and an ultrasonic sensor;
   the processor which implements:
      an object detection unit which detects an object on the basis of a signal acquired by the measurement unit;
      a road shape prediction unit which predicts a road shape on which a target vehicle is traveling;
      a three-dimensional object selection unit which selects, from among the objects detected by the object detection unit, only a three-dimensional object within a predetermined range from a point of the road predicted by the road shape prediction unit; and
      a road shape estimation unit which estimates the road shape on the basis of position information of the three-dimensional object selected by the three-dimensional object selection unit; wherein
      the road shape prediction unit predicts a road shape within a predetermined range from the target vehicle on the basis of at least one of a traffic lane, a curb, a guardrail, a central reservation, a border between asphalt and a road end, a line of trees, and a traffic sign, and predicts a road shape outside of the predetermined range from the target vehicle on the basis of calculation results of the road shape within the predetermined range from the target vehicle; and the road shape estimation unit detects the number of traffic lanes next to a target vehicle traveling lane, and corrects a position of the three-dimensional object in accordance with the number of detected traffic lanes, to thereby estimate the road shape on the basis of the corrected position information of the three-dimensional object.

2. The traveling environment recognition device according to claim 1, wherein the three-dimensional object corresponds to at least one of a traffic lane, a curb, a guardrail, a central reservation, a border between asphalt and a road end, a tree, a building, a traffic sign, a moving object such as a car, and a wall.

3. The traveling environment recognition device according to claim 1, wherein the road shape estimation unit calculates a distance between a target vehicle traveling lane and the three-dimensional object, and corrects a position of the three-dimensional object, to thereby estimate the road shape on the basis of the corrected position information of the three-dimensional object.

4. The traveling environment recognition device according to claim 1, wherein the road shape estimation unit estimates, if an obstacle exists on the road, a route passing on a near side of the obstacle as the road shape.

5. The traveling environment recognition device according to claim 1 or claim 2, wherein the three-dimensional object selection unit selects, if a moving object exists on the road, the three-dimensional object so as to exclude the moving object.

6. The traveling environment recognition device according to claim 1 or claim 2, wherein the three-dimensional object selection unit discriminates, if a parked vehicle exists on the road, whether or not a three-dimensional object on the road is the parked vehicle, and selects the three-dimensional object so as to exclude the parked vehicle.

7. The traveling environment recognition device according to claim 1, claim 2 or claim 3, which outputs at least one of: a distance to a curve; a radius of the curve; a curvature of the curve; a tangent angle of the curve; a distance to a slope; an angle of the slope; and a change rate of a gradient.

8. The traveling environment recognition device according to claim 1, claim 2 or claim 3, which outputs at least one of: a height and a type of a three-dimensional object at a road end; a position and a relative speed of a vehicle ahead, an oncoming vehicle, and a stationary vehicle; a type of a traffic lane; and the number of traffic lanes.

9. The traveling environment recognition device according to claim 4, which calculates a proper speed for traveling on the road shape which is detected on the basis of at least one of: the distance to the curve; the radius of the curve; the curvature; the tangent angle of the curve; the distance to the slope; the angle of the slope; the change rate of the gradient; a height of a three-dimensional object at a road end; a type of the three-dimensional object at the road end; a position and a relative speed of a vehicle ahead, an oncoming vehicle, and a stationary vehicle; a type of a traffic lane; and the number of traffic lanes.

10. The traveling environment recognition device according to claim 4, which performs deceleration by means of at least one of a brake, an engine brake, and a regenerative brake when determining a need for the deceleration on the basis of at least one of: the distance to the curve; the radius of the curve; the curvature; the tangent angle of the curve; the distance to the slope; the angle of the slope; and the change rate of the gradient.

11. The traveling environment recognition device according to claim 2, wherein the road shape estimation unit estimates, if an obstacle exists on the road, a route passing on a near side of the obstacle as the road shape.

12. The traveling environment recognition device according to claim 11, which calculates a proper speed for traveling on the road shape which is detected on the basis of at least one of: the distance to the curve; the radius of the curve; the curvature; the tangent angle of the curve; the distance to the slope; the angle of the slope; the change rate of the gradient; a height of a three-dimensional object at a road end; a type of the three-dimensional object at the road end; a position and a relative speed of a vehicle ahead, an oncoming vehicle, and a stationary vehicle; a type of a traffic lane; and the number of traffic lanes.

13. The traveling environment recognition device according to claim 11, which performs deceleration by means of at least one of a brake, an engine brake, and a regenerative brake when determining a need for the deceleration on the basis of at least one of: the distance to the curve; the radius of the curve; the curvature; the tangent angle of the curve; the distance to the slope; the angle of the slope; and the change rate of the gradient.

* * * * *